Jan. 17, 1967 E. G. CLARK 3,299,292
CONTROL MEANS FOR TRANSISTORIZED MAGNETIC CORE SWITCHING CIRCUITS
Filed Feb. 25, 1964
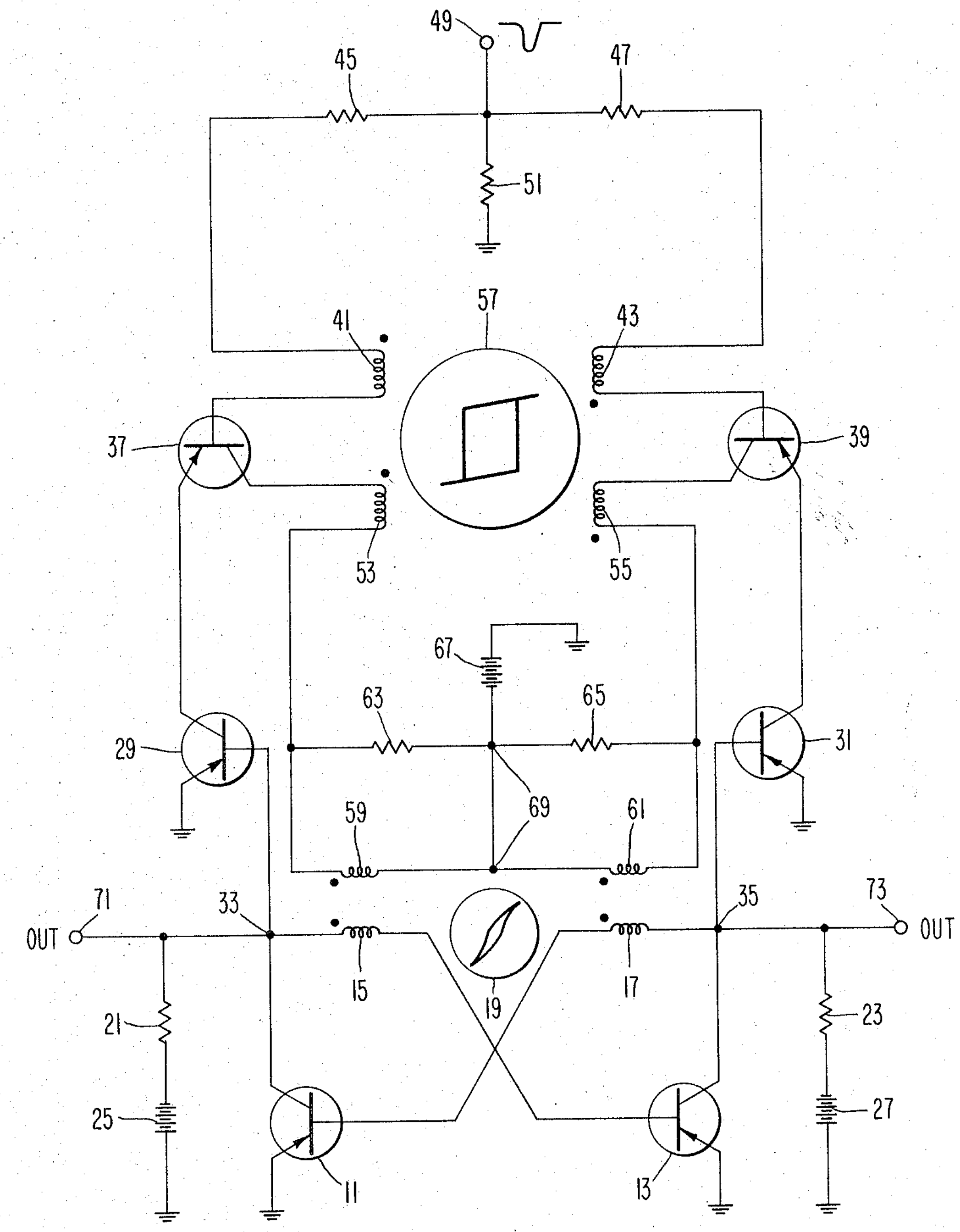
INVENTOR.
EDWARD G. CLARK
BY Kevin R. Peterson
AGENT 3,299,292

CONTROL MEANS FOR TRANSISTORIZED MAGNETIC CORE SWITCHING CIRCUITS

Edward Gary Clark, Strafford, Pa., assignor to Burroughs Corporation, Detroit, Mich., a corporation of Michigan
Filed Feb. 25, 1964, Ser. No. 347,274
13 Claims. (Cl. 307—88.5)

The present invention relates to circuit means for controlling the operation of transistorized magnetic core switching circuits and in particular to means for providing an indication of the end, or the approach of the end, of a switching cycle.

Magnetic cores of square hysteresis loop material have found wide acceptance and use in electronic computer circuits. Due to the fact that they can be made to assume and maintain one of two magnetic states, information represented by the condition of magnetic cores may be processed through logic circuits using said cores.

In circuits of this type it sometimes becomes necessary to control or regulate the switching cycle of the magnetic core. In such cases it also becomes necessary to control current flow in elements associated with the magnetic core. In transistorized circuits, one very important element in which regulation of current flow would be significant is the collector path of the circuit.

A transistor magnetic pulse amplifier is frequently used as a driver for magnetic core switching circuits. In such an amplifier, hereafter referred to as a TMA, a transistor is regeneratively connected through collector and base windings on a common square hysteresis loop magnetic core. When a pulse of proper polarity to forward bias the transistor is applied to the base, collector current begins to flow. The flow of collector current tends to switch the core to its opposite magnetic state and induces a voltage in the base winding of a polarity to increase the conduction of the transistor until the transistor saturates or bottoms. The switching process is now self-sustaining and the input pulse can be removed.

The core will continue to switch until it approaches saturation. As core saturation is approached, the amount of collector current required to continue the switching increases sharply. The collector current can no longer maintain the core switching and the regenerating voltage begins to decrease thereby reducing the base current and quickly cutting off the transistor. The flux about the core rapidly collapses, and the core lapses to its new remanent state. At the termination of the core switching in the TMA, there is a sharp increase in the collector current, even with no input signal, due to the decrease in impedance of the switched core and also due to the sweeping out of the holes stored in the base region of the transistor while conducting at saturation. This increase of current can seriously increase the collector dissipation of the transistor and, if the transistor were operating normally near its maximum current level, could cause damage and possibly burnout of the transistor due to $I^2R$ heating.

It is, therefore, an object of the present invention to provide circuit means to control the switching cycle of magnetic core switching circuits.

It is a further object of the invention to provide circuit means to regulate the flow of collector current in transistors used in magnetic core switching circuits.

It is a further object of the invention to provide circuit means to prevent the flow of collector hole storage current, beyond a predetermined level, in transistors used in magnetic core switching circuits.

It is a still further object of this invention to provide circuit means for effecting pulse control, particularly pulse delay, in circuitry of the type herein set forth.

Other objects and attendant advantages of this invention will be readily appreciated as the same becomes better understood by reference to the following detailed description when considered in connection with the accompanying drawing.

The triggering circuit of the present invention utilizes the increasing current through the TMA after core switching to initiate complementary switching of a bistable flip-flop, through windings on a coupling magnetic core common to the cross couplings in the flip-flop. The point at which the flip-flop will switch is controlled by the turns ratio of the windings on the core. The flip-flop is thus used to provide an indication of the end of the switching cycle, to control hole storage current through the triggering means and also to provide a delayed output pulse.

The single figure in the drawings is a schematic diagram of one form of switching circuit of the present invention. The circuit comprises a saturation flip-flop, having two cross-coupled transistors, which is made complementing by two AND gates, one gate for each transistor of the flip-flop. Each of the AND gates is made up of two series-connected transistors, one transistor of each AND gate being part of a TMA and the other acting as an enabling transistor.

In the flip-flop a first transistor 11 and a second transistor 13 are cross connected, the collectors of each transistor being directly connected to the base of the other through windings 15 and 17, respectively, on a common magnetic core 19. The emitters of the cross-connected transistors are directly connected to ground. The collectors of transistors 11 and 13 receive their operating potential through individual resistive loads 21 and 23 from potential sources 25 and 27, respectively.

The magnetic core 19 used with the saturation flip-flop does not have to be composed of square hysteresis loop material. Through the use of non-square material an additional time delay is gained in the operation of the flip-flop.

The enabling transistors 29 and 31 of the serially connected transistor AND gates are in a common emitter configuration with the emitters grounded and with each base connected to receive a signal from junctions 33 and 35, respectively, between the collector and resistive load of its transistor of the flip-flop. The collector of each enabling transistor 29, 31 is directly connected to the emitter of its associated TMA transistor 37, 39 of the respective AND gate.

The second transistor of each AND gate, as previously stated, is used in a TMA. The bases of each of the TMA transistors 37, 39 are joined together through windings 41 and 43 on a common core 57 and resistors 45 and 47, respectively, and receive input signals through a common terminal 49. The incoming trigger voltage is developed over grounded resistor 51. The collectors of the TMA transistors 37, 39 receive their collector potentials through windings 53 and 55, respectively, on the core 57 of the TMA and through windings 59 and 61, respectively, on the magnetic core 19. Windings 59 and 61 are shunted by resistors 63 and 65, respectively. A source of potential 67 is connected between ground and a common circuit junction 69 between resistors 63 and 65 and windings 59 and 61. The base and collector regenerative windings of both TMA transistors on the single common square hysteresis loop core 57 form two transistor magnetic pulse amplifiers. Signal outputs 71 and 73 are illustrative of suitable circuit points from which a signal may be derived.

The core 19, thus, has four windings thereon. There are two windings 15 and 17 in the cross-connection paths of the flip-flop. These windings may be treated as secondary windings for the core 19, which is used as a transformer. The windings 59, 61 in series with the collector current paths of the TMA transistors in the AND gates may be treated as primary windings on the transformer. The collector current level through a primary winding before the TMA core has switched is insufficient to induce a switching signal in its associated secondary winding. The increased current through a primary winding after the magnetic core 57 of a TMA has switched, however, is sufficient to induce a switching signal in a secondary winding. The magnitude of this induced signal voltage is sensed by the flip-flop which is caused to change conductive states if the voltage is above a predetermined level. The turns ratio of the windings on the core is critical, the number of turns being determined by the current level at which the flip-flop will be made to change conductive states.

In the operation of the circuit assume transistor 11 of the flip-flop is conducting. The current through this transistor passes from ground through the transistor, through the load resistor 21 and back to the source 25. The voltage drop across the load resistor 21 develops a positive signal of the common circuit juncture 33 of the conducting flip-flop transistor collector, the load resistor 21, the base of the enabling transistor 29 of the AND gate associated with conducting flip-flop transistor 11 and the cross coupling connection to the base of the non-conducting transistor 13 of the flip-flop. Assuming in this description that all of the transistors are of the PNP type, the positive signal applied to the bases of the non-conducting enabling transistor 29 and flip-flop transistor 13 maintains them in a cut-off condition.

The second transistor 13 of the flip-flop, being in a cut-off condition, has the full negative collector potential applied thereto. This negative potential is applied at a second common circuit junction 35 similar to the first described above. A negative potential applied to the base of the conducting transistor 11 of the flip-flop maintains this transistor in a saturated condition. The negative potetial applied to the base of the AND gate transistor 31 associated with a non-conducting flip-flop transistor enables the transistor. This transistor, however, is in series with its TMA transistor 39 so that transistor 31 cannot conduct unless, in addition to being enabled, the TMA transistor 39 has forward bias applied to its base.

Assume now that a triggering pulse is received at common input terminal 49. Since AND gate transistor 31 is enabled to conduct by the negative potential on its base, TMA transistor 39 will conduct upon receiving the input pulse. The current path will be from ground, through transistor 31, through transistor 39, through collector winding 55 on TMA core 57, through winding 61 on the core 19 and its shunting resistor 65, to potential source 67 and back to ground. The regenerative connection of the collector and base windings 55 and 43 on TMA core 57 will cause transistor 39 to continue conduction at saturation after the triggering pulse has terminated.

The collector current level through winding 61 before the TMA core 57 switches to its new remanent state is insufficient to induce a switching signal in its associated secondary winding 17. After core 57 switches, there is a sharp increase in the collector current as explained above. This increased current through winding 61 is sufficient to induce a switching signal into secondary winding 17. The signal induced in winding 17 cuts off transistor 11. The cutting off of transistor 11 causes a common junction 33 to rise to a negative potential. The negative potential at junction 33 is coupled through winding 15 to the base of transistor 13. Transistor 13 will now conduct at saturation, raising common junction 35 to a positive potential. The positive potential at junction 35 is applied to the base of transistor 31, switching this transistor off, thereby opening the emitter path of TMA transistor 39. The switching off of transistor 39 prevents the flow of excessive collector current due to minority carrier storage. The circuit conditions within the circuit have now reversed and the system is ready to receive another input trigger.

The two TMA transistors 37 and 39 and their associated enabling transistors 29 and 31 provide complementing switching for the input signals to the flip-flop. An input signal to the common input terminal 49 will make that TMA transistor conduct which is in series with an enabled gate transistor. The other TMA transistor cannot conduct since it is in series with a disabled transistor.

As noted in the circuit description, the collector of the TMA transistor receives its potential through a winding on the coupling core between the AND gates and the flip-flop. The collector current passing through this winding before switching of the TMA core is insufficient to induce a switching signal into the winding cross connecting the saturation flip-flop. The increased current, after the TMA core has switched, will induce a signal into the cross-connecting winding and cause the flip-flop to change to its opposite conductive state.

The current level at which the flip-flop is caused to switch is determined by the turns ratio of the windings on core 19. Through the proper selection of the turns ratio the maximum level of excess current through the TMA transistor can be predetermined. Depending on the level of current selected, the switching of the flip-flop can be used to provide an indication of the end of the approach of the end of the switching cycle in the TMA. The circuit thereby also provides control over the current level in the magnetic core switching circuit.

Pulse control, particularly pulse delay, is provided in the system of the present invention by the inherent delay in the TMA driver stages and by selecting a point toward the end of the TMA pulse to trigger the flip-flop.

To explain the inherent time delay in the TMA, assume that the TMA core is in the zero state and that it is desired to switch the core to the one state. When a trigger pulse is applied to the base of the TMA transistor, base current begins to flow. Due to the sense of the collector and base windings on the TMA core, the initial base current tends to drive the TMA core to the zero state. The flow of base current also causes collector current to flow and this current tends to drive the core to the one state. The magnetic field produced by the collector current induces a current in the base winding. The time it takes for the collector current to rise to a level sufficient to overcome the switching effect of the initial base current provides a determinable time delay in the TMA before the output switching pulse is developed.

As explained previously, a sharp rise in collector current occurs at the termination of the TMA pulse due to the sweeping out of the holes stored in the base region of the transistor while conducting at saturation. This rise in current can be detected and a particular level and corresponding time selected for triggering the flip-flop through the use of a current-sensing device. The coupling core between the TMA drivers and the flip-flop serves as this current-sensing device. The turns ratio on the core determines the current level and time at which the flip-flop is triggered. This time delay is the width of the TMA pulse before overshoot begins plus the time corresponding to the particular level of overshoot current selected. The total time delay in the system is then the sum of two delays, that is, the initial delay before the generation of the TMA pulse plus the particular TMA pulse width selected.

Those features of the invention which are believed to distinguish the novel aspects thereof are set out with particularity in the appened claims.

I claim:

1. A circuit for controlling the level of transient pulse current in a transistor magnetic pulse amplifier in which the output of the amplifier is regeneratively coupled to the input through windings on a common square hysteresis loop magnetic core comprising current-sensitive coupling means for detecting the instantaneous magnitude of transient pulse current flowing in said amplifying means and for coupling a triggering pulse at a predetermined current level of said transient current, cross-coupled flip-flop means for receiving said triggering pulse and providing an output in response thereto, and enabling means in series with said transistor magnetic pulse amplifying means, the conducting state of said enabling means and in turn said amplifying means being determined by the output of said flip-flop means.

2. A system for providing an indication of the approach of the end of the switching cycle in a transistor magnetic pulse amplifier in which the output is regeneratively coupled to the input through windings on a square hysteresis loop magnetic core comprising cross-coupled flip-flop means including impedance means in said cross-couplings for controlling the state of the flip-flop means and current-sensitive means for coupling said flip-flop impedance means to said pulse amplifier means, the current level through said current-sensitive means determining the time at which switching of said flip-flop means will be initiated, the switching of said flip-flop thereby providing an indication of the approach of the end of the switching cycle in said transistor magnetic pulse amplifier.

3. A current control circuit for use with transistor switching circuits comprising AND gate means including a square hystersis loop magnetic core and first and second serially connected transistors, said first transistor having its output regeneratively coupled to its input through windings on said square hystersis loop magnetic core, said second transistor being connected in series between said first transistor and a source of reference potential, flip-flop means including first and second cross-connected transistor means, and current-sensitive means for coupling said AND gate means to said flip-flop means, said current-sensitive means including a magnetic core, said core having primary and secondary windings thereon, said primary windings being in series with a major current path through said AND gate means, said secondary windings being in said cross connections of said transistor means, the windings on said core having a predetermined turns ratio, said turns ratio determining the level of AND gate current at which said flip-flop will be triggered and the triggering of said flip-flop means determining the conducting state of said AND gate means thereby limiting the current through said AND gate means.

4. A transistor switching circuit providing both pulse delay and current control comprising input means for receiving triggering pulses, means for delaying and amplifying said input pulses including a transistor magnetic pulse amplifier and AND gate means, current-sensitive coupling means for detecting the termination of an amplified pulse from said amplifying AND gate means, and cross-coupled flip-flop means controlled by said current-sensitive coupling means for determining the conductive state and current level through amplifying AND gate means and for enabling said AND gate means.

5. The transistor switching circuit as in claim 4 wherein said amplifying and delaying means includes a square hysteresis loop magnetic core and first and second serially connected transistors, said first transistor having its output regeneratively coupled to its input through windings on said square hysteresis loop magnetic core, and said second transistor being connected between said first transistor and a source of reference potential and functioning as an enabling transistor for said AND gate means.

6. The transistor switching circuit as in claim 4 wherein said current-sensitive coupling means comprises a magnetic core, said core having primary and secondary windings thereon, said primary windings being in series with the major current path through said amplifying and delaying means, said secondary windings being in the cross-coupling paths of said flip-flop means, the windings on said core having a predetermined turns ratio, said turns ratio determining the level of current through said amplifying and delaying means at which triggering of said flip-flop means will be initiated thereby determining both pulse delay and current level through said switching circuit.

7. A complementary switching circuit comprising first and second gate means, each of said gating means including first and second serially connected transistors, a square hysteresis loop magnetic core individually and regeneratively coupling the outputs to the inputs of each of said first transistors, each of said second transistors serving as enabling means for its gating means, a flip-flop for controlling said enabling transistors and including a pair of cross-coupled transistors, and magnetic core transformer means having individual primary windings in the main current paths of said first and second gating means and individual secondary windings in the cross couplings of said transistors of said flip-flop for controlling the state of said flip-flop, the increased current through said primary windings after the switching of said core regeneratively coupling said first transistors of said gating means initiating change of state of said flip-flop.

8. In a device utilizing a transistor having a first main current-carrying electrode and a control electrode regeneratively coupled to form a current path with a square hysteresis loop magnetic core and a second main current-carrying electrode coupled to a source of reference potential, control means comprising magnetic core transformer means having primary windings and secondary windings of predetermined turns ratio, said primary windings being in said current path of said first main current-carrying electrode and condition responsive switching means for preventing the flow of collector hole storage current through said transistor beyond a predetermined level upon substantial switching of said core, said switching means being coupled between said second main current-carrying electrode and said source of reference potential and controlled by said secondary windings of said transformer means for cutting off said transistor at a given current level therethrough.

9. The circuit of claim 8 wherein said switching means comprises a bistable circuit having at least a pair of electron devices with interconnections controlling the change of state of the bistable circuit, and an enabling transistor serially connected to said second main current-carrying electrode, said enabling transistor being controlled by the change of state of said bistable circuit.

10. A transistor switching circuit comprising a common input means for receiving a trigger pulse, transistor magnetic pulse amplifying means for producing a delayed amplified pulse upon receiving said trigger pulse, said pulse amplifying means including amplifying AND gate means having an output, a control input and a signal input driven by said trigger pulse input means, and means interconnecting said output and said signal input for delaying said amplified pulse, current-sensitive means for determining the current level of said amplified trigger pulse, and for producing a pulse when said current exceeds a predetermined level, and cross-connected flip-flop means for receiving said pulse and changing state in response thereto whereby said flip-flop means produces a delayed output pulse disabling said AND gate means thereby limiting the current therethrough.

11. In a system for providing an indication of the approach of the end of a switching cycle in a transistor magnetic pulse amplifier having its output regeneratively coupled to its input through windings on a square hysteresis loop magnetic core, an indicating circuit comprising means for sensing a predeterminel level of overshoot current during the end of said switching cycle in said transistor magnetic pulse amplifier, and for producing a signal thereupon, and switching means having interconnected switching elements controlled by said signal for indicating the conductive state of said transistor magnetic pulse amplifier.

12. The indicating circuit, as in claim 11, wherein the current-sensing means includes a transformer having primary and secondary windings of predetermined turns ratio, said primary windings being in a major current path through said transistor magnetic pulse amplifier and said secondary windings being individually interconnected between said switching elements, the turns ratio of said windings determining the level of current at which a switching signal is coupled from said primary to said secondary windings.

13. The indicating circuit, as in claim 11, wherein said switching means comprises at least a pair of cross-connected electron devices and an enabling electron device controlled thereby, said enabling electron device being serially connected between said transistor magnetic pulse amplifier and a source of reference potential, the initial state of said electron devices being determined by the signal from said current-sensing means.

References Cited by the Examiner

UNITED STATES PATENTS

| | | | |
|---|---|---|---|
| 2,798,169 | 7/1957 | Eckert | 328—39.5 |
| 2,916,729 | 12/1959 | Paull | 307—88.5 |
| 2,994,788 | 8/1961 | Clark | 307—88.5 |
| 3,104,333 | 9/1963 | Freeburn | 307—88.5 |

ARTHUD GAUSS, *Primary Examiner.*

J. S. HEYMAN, *Assistant Examiner.*